United States Patent [19]

Tracy

[11] 3,737,970

[45] June 12, 1973

[54] TORSION BAR ADJUSTING TOOL

[76] Inventor: Harold G. Tracy, 14414 Minock, Detroit, Mich. 48223

[22] Filed: Aug. 6, 1971

[21] Appl. No.: 169,856

Related U.S. Application Data

[63] Substitute of Ser. No. 660,936, May 22, 1957.

[52] U.S. Cl.......................... 29/225, 29/267, 72/458
[51] Int. Cl............................................. B23p 19/04
[58] Field of Search .................... 29/225, 230, 267; 254/77, 120; 72/458, 479

[56] References Cited
UNITED STATES PATENTS

| | | | |
|---|---|---|---|
| 1,354,448 | 9/1920 | Walt | 72/458 |
| 1,605,771 | 11/1926 | Pringle | 29/230 |
| 1,736,585 | 11/1929 | Fehlhaber | 72/458 X |

FOREIGN PATENTS OR APPLICATIONS

| | | | |
|---|---|---|---|
| 610,644 | 10/1948 | Great Britain | 29/230 |

*Primary Examiner*—Granville Y. Custer, Jr.
*Assistant Examiner*—J. C. Peters
*Attorney*—Barthel and Bugbee

[57] ABSTRACT

This torsion bar gripping and adjusting tool has an elongated handle having a jaw-supporting shank and having first and second bar gripping jaws mounted on said shank in spaced relationship thereon. The first jaw has a first bar gripping portion with a first bar engaging recess therein facing in one direction and engageable with one side of the torsion bar whereas the second jaw has a second bar gripping portion with a second bar engaging recess therein facing in the opposite direction from the first bar engaging recess and engageable with the opposite side of the bar from the side thereof engaged by the first recess. The bar gripping portions and the bar engaging recess comprise oppositely-facing hooks which are offset laterally relatively to the shank, with the recesses aligned with one another upon an axis disposed substantially parallel to the axis of the shank. One of the jaws is fixedly mounted on the shank and the other jaw is slidably mounted thereon for sliding motion toward and away from the fixedly mounted jaw. Means consisting of shank receiving bores of non-circular cross-section in both jaws fit the shank of corresponding non-circular cross-section to prevent relative rotation between the jaws and shank.

3 Claims, 5 Drawing Figures

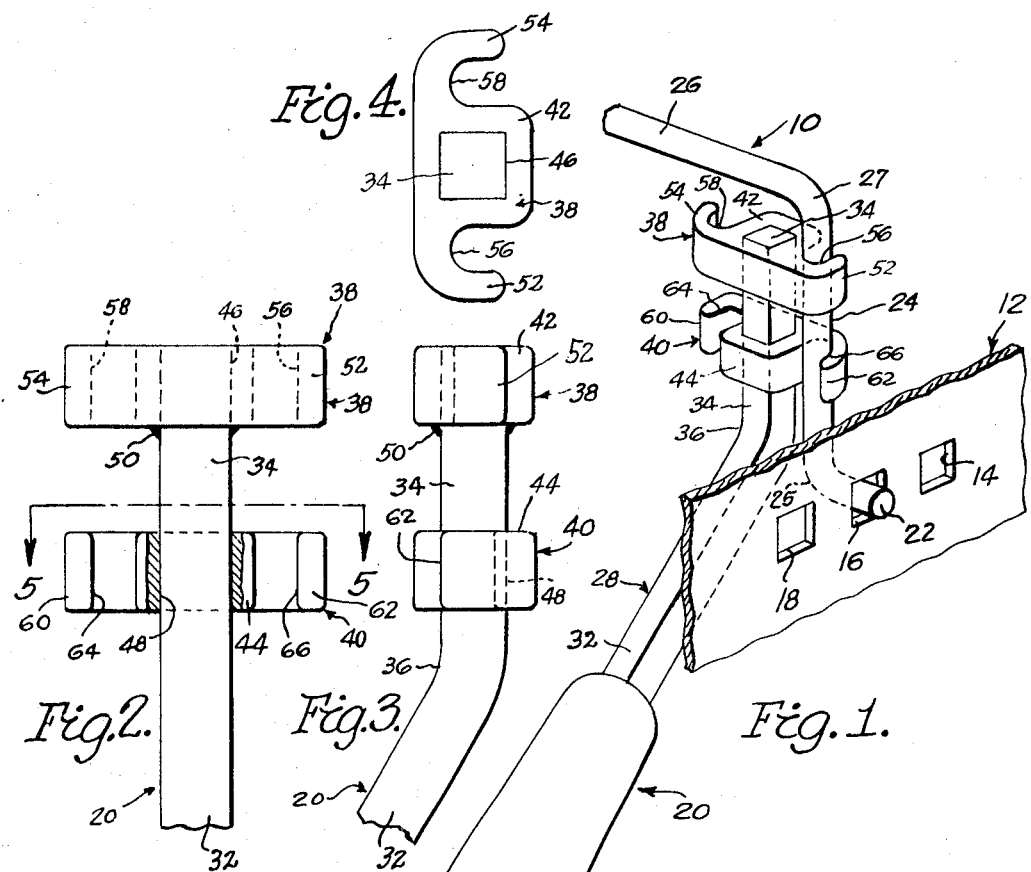
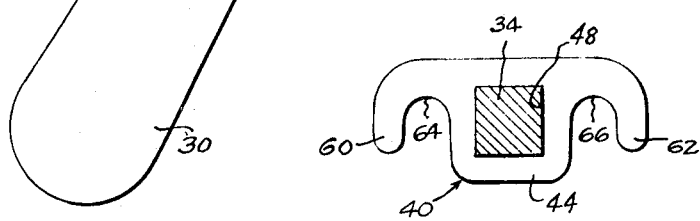

3,737,970

TORSION BAR ADJUSTING TOOL

BACKGROUND OF THE INVENTION

In the automobile industry, automobile bodies are provided with baggage compartments in so-called rear decks having so-called rear deck lids which serve as closures for the compartments. Such deck lids are pivoted by suitable hinges to the automobile bodies and the weight of certain types is counterbalanced by the force exerted by a torsion rod or bar extending transversely across the body and having bent opposite ends adapted to be inserted in one of a series of holes or sockets in so-called support brackets. The particular hole or socket into which the torsion bar is inserted determines the amount of torque exerted by the torsion bar upon the deck lid and consequently determines whether or not the deck lid weight is adequately counterbalanced, is insufficiently counterbalanced or is overcounterbalanced. Hitherto, the adjustment of these torsion bars to obtain the proper counterbalancing effect has been a tedious task carried out in cramped space with the necessity for using several different tools, no one of which has been adequate for the purpose. The adjustment of these torsion bars has been necessary, not only at the automobile factory but also in the service departments of automobile sales agencies and has constituted a problem for which no satisfactory solution has hitherto existed.

SUMMARY OF THE INVENTION

The present invention provides a torsion bar adjusting tool by which this adjustment of the torsion bar is accomplished in a rapid and easy manner without the necessity for employing additional tools, and capable of being used either on the right-hand or left-hand side of the automobile body, since each deck lid has a right-hand torsion bar and a left-hand torsion bar for applying the counterbalancing force at opposite sides of the body.

This invention provides a torsion bar adjusting tool which is readily engageable with the intermediate portion of a torsion bar so as to quickly and easily withdraw the end portion of the torsion bar from the hole or socket of the support bracket and to twist the torsion bar while simultaneously reinserting the end portion into a different hole or socket so as to apply a greater or lesser amount of counterbalancing torque to the deck lid, as desired.

This tool is instantly adaptable to the disengagement, twisting and re-engagement of the end portion of either the right-hand or left-hand torsion bar from its respective support bracket, by means of a rapid and simple manipulation.

The shank has longitudinally-spaced torsion-bar-gripping jaws facing in opposite directions so as to grip opposite sides of the torsion bar with a firm and slip-proof hold. One of the jaws is slidably mounted on the shank for adjustment relatively to the other jaw in order to avoid interference with or from fasteners or other projections which might otherwise interfere with the free manipulation of the tool.

In the drawings,

FIG. 1 is a perspective view of one embodiment of the tool of the present invention as applied to the adjustment of a deck lid torsion bar, just prior to making the adjustment;

FIG. 2 is a fragmentary top plan view of the forward end of the tool shown in FIG. 1, with the central portion of the ear jaw in longitudinal section in order to show its slidable engagement with the tool shank;

FIG. 3 is a fragmentary side elevation of the tool end portion shown in FIG. 2;

FIG. 4 is a forward end elevation of the tool, shown in top plan view in the operating position of the tool illustrated in FIG. 1; and FIG. 5 is a cross-section taken along the line 5—5 in FIG. 2.

Referring to the drawings in detail, FIG. 1 shows fragmentarily a right-hand torsion bar 10 installed in an automobile body (not shown) for counterbalancing the weight of a rear deck or baggage compartment lid (also not shown) relatively to a support bracket 12, the latter having a series of spaced holes or sockets 14, 16 and 18 into which a torsion bar adjusting tool, generally designated 20, is enabled to insert the torsion bar end portion 22 by grasping the intermediate portion 24 connecting the main portion 26 with the end portion 22. The portions 22 and 26 are approximately perpendicular to the intermediate portion 24 which they meet at lower and upper junctions or bends 25 and 27 respectively. The companion torsion bar 10 (not shown) of the opposite hand has the reverse construction in that its main portion lies parallel to the other main portion 26 but its intermediate portion is on the opposite side of the vehicle body from the intermediate portion 24 and its end portion faces outward in the opposite direction from the outwardly-facing end portion 22 of the torsion bar 10.

The support bracket 12 is shown only in fragmentary form so as not to conceal the showing of the parts which would otherwise lie behind it. It will be understood, and it is well-known among body engineers and in the automobile industry generally, that the support brackets 12 are approximately inverted L-shaped with their upper arms secured to the underside of the rear deck adjacent the deck lid opening.

The torsion bar adjusting tool 20 is provided with an elongated shank 28 preferably of square cross-section (FIGS. 4 and 5) and preferably of square cross-section (FIGS. 4 and 5) and preferably made from tool steel or other strong material. A handle 30 mounted on its rearward end is provided for grasping by the hand of the operator. The shank 28 has an elongated straight rearward portion 32 carrying the handle 30 and a shorter forward portion 34 bent relatively thereto at the location 36 at a suitable angle, the obtuse angle of 150° having been found satisfactory for this purpose. Mounted in axially-spaced relationship on the forward portion 34 of the shank 28 are oppositely-facing forward and rearward jaws, generally designated 38 and 40 respectively. The jaws 38 and 40 are of generally similar construction with central hubs 42 and 44 containing square holes or bores 46 and 48 shaped to snugly receive the forward portion 34 of the shank 28. The forward jaw 38 is welded, brazed or otherwise firmly and immovably secured at 50 to the shank portion 34 whereas the bore 48 in the hub 44 slidably receives the shank portion 34 so that the rearward jaw 40 slides along the shank portion 34 relatively to the fixed forward jaw 38.

The fixed forward jaw 38 has right-hand and left-hand hook portions 52 and 54 (FIG. 4) extending laterally from the hub 42 and forming right-hand and left-hand U-shaped notches 56 and 58 respectively for receiving the torsion bar intermediate portion 24. The slidable rearward jaw 40 on the other hand has upwardly-facing right and left-hand hook portions 60 and 62 providing right-hand and left-hand similar U-shaped notches 64 and 66 facing upwardly in the opposite direction from the notches 56 and 58 of the forward jaw 38. Instead of securing the forward jaw 38 to the forward portion 34 of the shank 28 by welding or brazing, it may be likewise fixedly and immovably secured to the shank portion 34 by a suitable fastener such as by a set screw or Allen screw.

In the operation of the invention, let it be assumed that the right-hand torsion bar 10, the left-hand end of the main portion 26 of which is secured to the deck lid, is to be adjusted in order to properly counterbalance the deck lid from the position shown in FIG. 1 with the end portion 22 in the hole or socket 16 to the hole or socket 14 or 18 by a combination of pulling and twisting. In order to do this, the operator grasps the handle 30 in one hand and tilts the forward end portion 34 thereof until the intermediate portion 24 of the torsion bar 10 can be inserted in the space between the forward and rearward jaws 38 and 40, whereupon he pulls backward on the handle 30 to swing the tool 20 clockwise around the point of bend 36 to simultaneously engage the forward and rearward oppositely-facing notches 56 and 66 of the hook portions 52 and 62 with the opposite sides of the intermediate portion 24 of the torsion bar 10.

The operator then twists the handle 30 so as to swing the jaws 38 and 40 to the left, bending the torsion bar intermediate portion 24 relatively to the torsion bar main portion 26 at their junction 27 so as to pull the end portion 22 out of the hole or socket 16, whereupon the operator, by pulling upward or downward upon the handle 30, swings the intermediate portion 24 rearward or forward to bring the end portion 22 opposite and in alignment with the hole or socket 18 or 14 respectively. By releasing the sidewise twisting action on the intermediate portion 24, the operator permits the end portion 22 of the torsion bar 10 to enter the selected hole or socket 18 or 14 with which it is momentarily aligned, and a new torsional effect is then imparted to the longitudinal portion 26 of the torsion bar 10 and transmitted thereby to the deck lid to counterbalance the latter.

What I claim is:

1. A torsion bar gripping and adjusting tool comprising
   an elongated handle structure including a jaw-supporting shank,
   and first and second bar gripping jaws mounted on said shank of said handle structure in spaced relationship thereon,
   said first jaw having a first bar gripping portion with a first bar engaging recess therein facing in one direction and engageable with one side of the bar,
   said second jaw having a second bar gripping portion with a second bar engaging recess therein facing in the opposite direction from said first bar engaging recess and engageable with the opposite side of the bar from the side thereof engaged by said first recess,
   said bar gripping portions and the bar engaging recesses thereof comprising oppositely-facing hooks which are offset laterally relatively to said shank,
   said recesses being aligned with one another upon an axis disposed substantially parallel to the axis of the shank.

2. A torsion bar adjusting tool, according to claim 1, wherein one jaw is fixedly mounted on said shank and the other jaw is slidably mounted on said shank for sliding motion toward and away from said one jaw.

3. A torsion bar adjusting tool, according to claim 1, wherein one jaw is provided with a shank receiving bore of non-circular cross-section and wherein the shank is of corresponding non-circular cross-section interlocking with said bore against relative rotation between said last-mentioned jaw and shank.

* * * * *